(No Model.)
P. W. DOYLE.
REPAIR COUPLING FOR WATER CLOSET BOWLS.
No. 575,923. Patented Jan. 26, 1897.
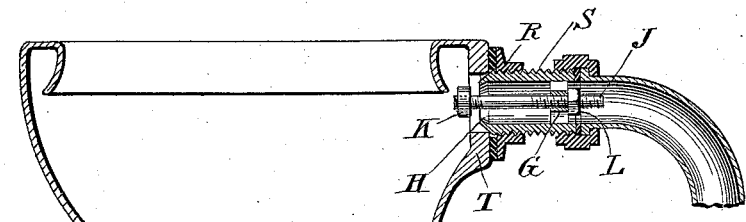
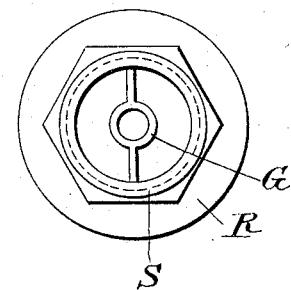
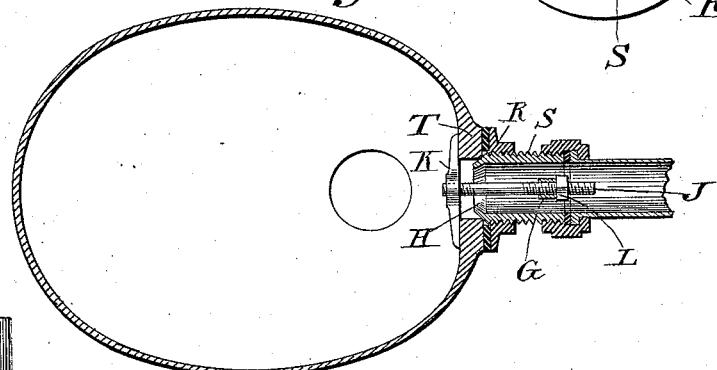
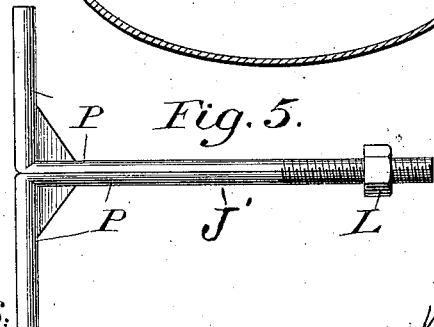
Witnesses.
Fred F. Wetzler
Frank S. Anderson
Inventor.
Patrick W. Doyle

UNITED STATES PATENT OFFICE.

PATRICK WILLIAM DOYLE, OF DENVER, COLORADO.

REPAIR-COUPLING FOR WATER-CLOSET BOWLS.

SPECIFICATION forming part of Letters Patent No. 575,923, dated January 26, 1897.

Application filed February 4, 1895. Serial No. 537,311. (No model.)

*To all whom it may concern:*

Be it known that I, PATRICK WILLIAM DOYLE, a citizen of the United States, residing at Denver, in the county of Arapahoe and State of Colorado, have invented a new and useful Repair-Coupling for Water-Closet Bowls, of which the following is a specification, reference being had to the accompanying drawings, showing a part thereof.

My invention has for its object the production of a repair-coupling adapted, perhaps, more particularly to the bowls of water-closets, which shall be simple in construction and easily applied.

It consists in a combination of devices and appliances hereinafter described and claimed.

In the drawings, Figure 1 is a vertical section of a bowl with my coupling attached thereto. Fig. 2 is a horizontal section. Fig. 3 is an end elevation of the coupling. Figs. 4 and 5 are details of the coupling-rod.

In carrying out the invention, T represents the bowl at the point where it is desired to attach the coupling.

S is a suitable nipple beveled at one end, as at H, and provided with an interior web or spider G.

J is a coupling link or bolt provided on its end with a cross-head K, engaged to the bolt by screw-threads and when in position engaging the bolt T at each side of the orifice. By means of the nut H the bolt J connects the nipple S with the bowl.

It will be observed that the nipple S is screw-threaded exteriorly.

R is a flange or washer adapted to fit the exterior of the nipple and with a suitable packing-washer between it and the bowl to effect a water-tight connection between the nipple S and bowl T.

The method of applying the coupling is as follows: The operator inserts the cross-head K into the interior of the bowl so that the cross-head bears upon the bowl adjacent to the orifice. The bolt J is then secured into the cross-head through the orifice, and the nipple S then inserted with its beveled end H fitting into the orifice in the bowl. The nut L is then screwed onto the bolt J until it bears against the spider G in the nipple and causes the nipple to bear tightly against the bowl. The flange R and packing-washer are then passed into the nipple and screwed tightly against the bowl. The pipe which it is desired to secure to the bowl with its coupling is then screwed onto the exterior of the nipple S. It often happens that the cross-head K will not bear equally on both sides of the orifice in the bowl, either because the sides are not on the same plane or are uneven. It often happens that the entire work must be prosecuted from the exterior of the bowl when the interior of the bowl is inaccessible. In such cases such a form of bowl as shown in Fig. 5 is advantageous. In consists in two semicircular bolts in cross-section, which when placed together form a circular bolt, each half provided with an outwardly-projecting arm P. Now, as will be seen, the bolt can be supported, one half inserted in the orifice in the bowl and the arm P brought to bear on its side of the orifice, and the other half can then be inserted and its arm P brought to a bearing on its side of the orifice and the two flat faces of the bolt then be brought together and the nut screwed on, as in the case of the other form of bolt.

It is obvious that various other changes might be made without departing from the spirit of my invention.

What I claim is—

1. A repair-coupling consisting of a bridge-piece to span the orifice, a hollow coupling-piece, a connecting-piece extending from the bridge to the coupling, and means independent of the coupling-piece for engaging it to the coupling-piece, substantially as described.

2. A repair-coupling consisting of a bridge-piece adapted to span the orifice, a hollow bridge-piece at the farther end of the coupling-piece, a connecting-piece between the bridge-piece at the bowl and the bridge-piece at the coupling, and means for engaging the connecting-piece to the bridge-piece at the coupling, substantially as described.

3. A repair-coupling the walls of which are imperforate consisting of a hollow coupling adapted to cover the orifice and means for holding said coupling-piece to the bowl consisting of one or more connecting-pieces shaped at one end to engage the bowl and provided on the other end with means for engaging the interior wall of the hollow coupling-piece, substantially as described.

4. A repair-coupling consisting of a nipple adapted to cover the orifice, an apertured bar across the nipple, a T-shaped screw-threaded bolt adapted to engage by its head the inner walls of the bowl and to project outwardly through the orifice and the bar-aperture, and a nut for engaging the outer end of the bolt, substantially as described.

5. A repair-coupling consisting of a hollow coupling-piece and means for connecting the coupling-piece to the bowl consisting of two pieces each provided with a projecting arm for engaging the bowl and each provided with means on the opposite end for engaging the coupling-piece, substantially as described.

6. A repair connection consisting of a hollow coupling-piece, and means for connecting the coupling-piece to the bowl consisting of two pieces semicircular in cross-section, each provided with a projecting arm for engaging the bowl and with screw-threads to receive the nut for engaging the connecting-piece to the coupling-piece, substantially as described.

7. A repair-coupling consisting of a hollow coupling-piece provided on its interior with a bridge-piece G, two connecting-pieces J' each provided with a projecting arm P and with screw-threads on the opposite end to receive the nut L, substantially as described.

PATRICK WILLIAM DOYLE.

Witnesses:
FRED FRANK WETZLER,
FRANK SKYLER ANDERSON.